April 7, 1931. A. TSCHERNE 1,799,608
MACHINE FOR MANUFACTURE OF ROTARY CUTTING TOOLS
Filed April 13, 1927 4 Sheets-Sheet 2

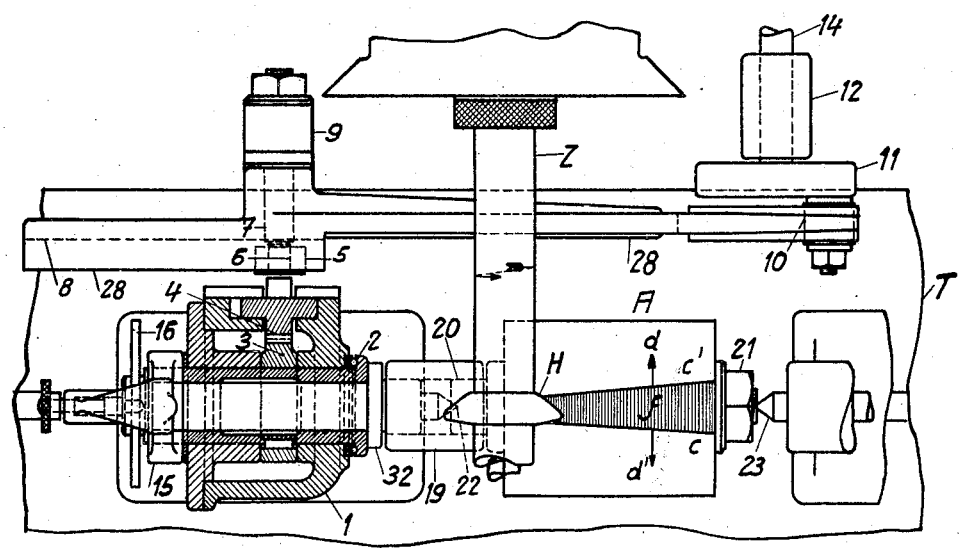

April 7, 1931.  A. TSCHERNE  1,799,608
MACHINE FOR MANUFACTURE OF ROTARY CUTTING TOOLS
Filed April 13, 1927  4 Sheets-Sheet 3

April 7, 1931.  A. TSCHERNE  1,799,608
MACHINE FOR MANUFACTURE OF ROTARY CUTTING TOOLS Filed April 13, 1927  4 Sheets-Sheet 4

Inventor
Alois Tscherne
By B. Singer, atty

Patented Apr. 7, 1931

1,799,668

UNITED STATES PATENT OFFICE

ALOIS TSCHERNE, OF RORSCHACH, SWITZERLAND

MACHINE FOR MANUFACTURE OF ROTARY CUTTING TOOLS

Application filed April 13, 1927, Serial No. 183,520, and in Switzerland and Germany February 14, 1927.

This invention relates to rotary cutting tools and more particularly to an improved apparatus for the manufacture of such rotary tools as milling cutters, reamers and the like, which are given a rotary motion when used and in which the cutting edges and the axis of rotation of the cutting tool cross one another. In the operation of the apparatus for manufacturing the cutting tool the blank from which the milling cutter or the like is made is mounted on a mandrel, which latter is rotatable in a reciprocating slide. The slide is moved at right angles to the axis of rotation of a profile milling cutter or other tool, which tool cuts recesses in the blank. The shaft and with it the blank are rotated during the axial displacement of the blank to a greater or less degree, while the profile milling cutter passes from one end of the blank to the other, so that a recess is cut in the blank, the lateral edges of which are inclined to one another. These side walls of the recesses may be in a straight line or may follow a helical line. The rotary cutting tool (milling cutters and reamers) are preferably so made that each two successive cutting edges of the milling cutter, reamer or the like are at an angle to one another, i. e. are not equidistant from one another at either end. Cutting tools of this kind have the advantage that for the same expenditure of power they do more work with a quieter drive. In the embodiment of the invention, two constructional examples of the apparatus are shown in the accompanying drawings.

Figure 1:
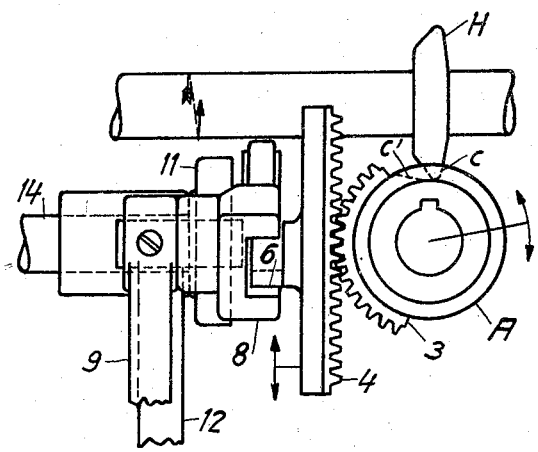
Figure 2:
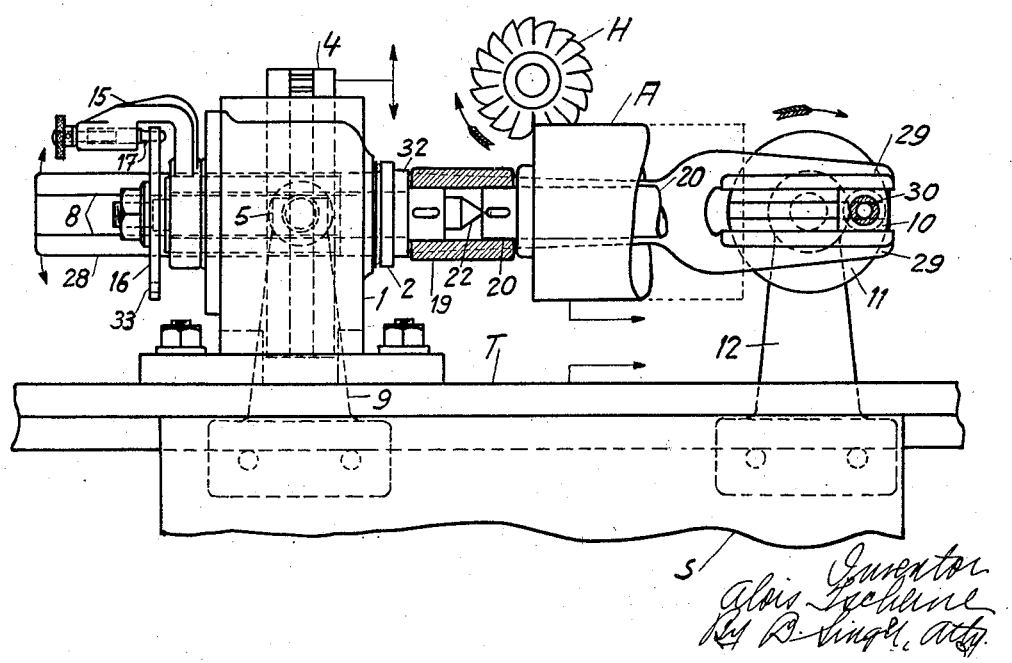
Figure 3:
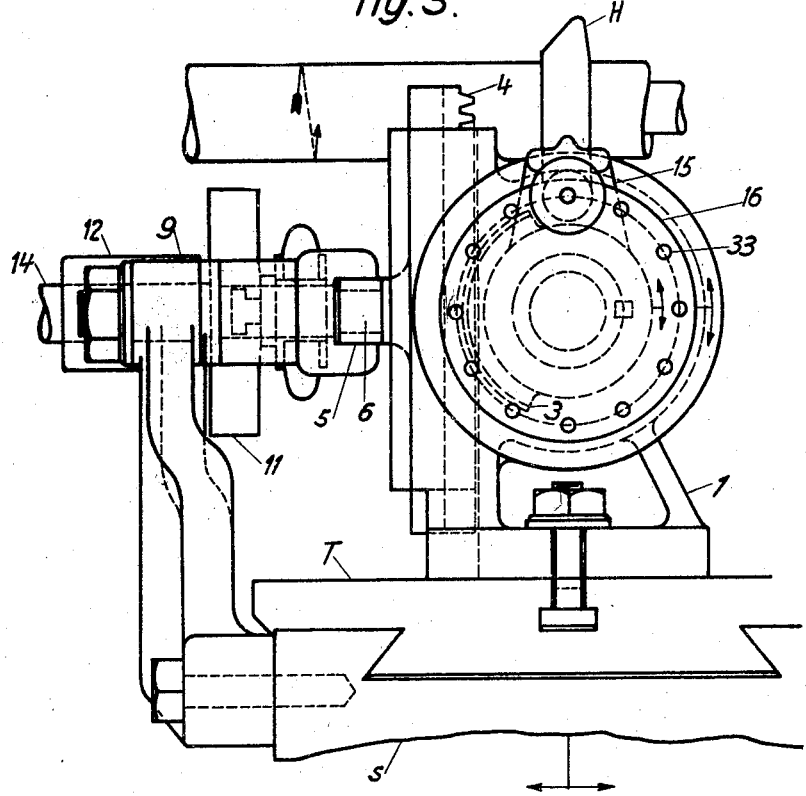
Figure 9:
Figure 10:
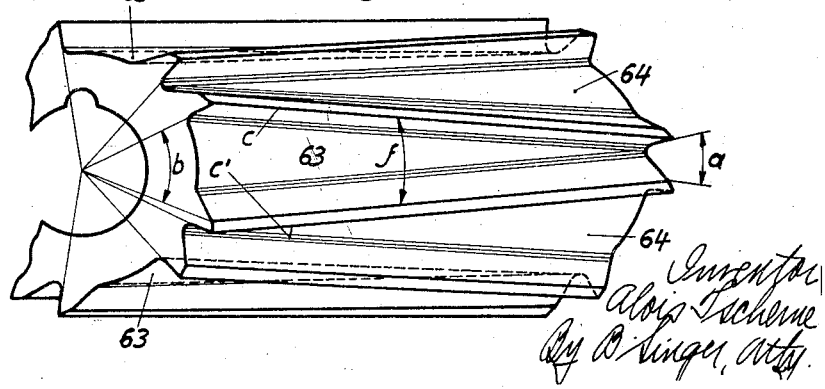
Figure 6:
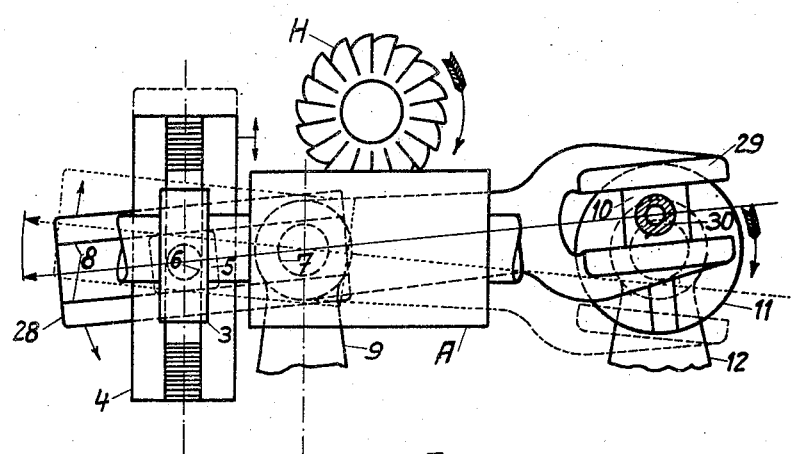
Figure 5:
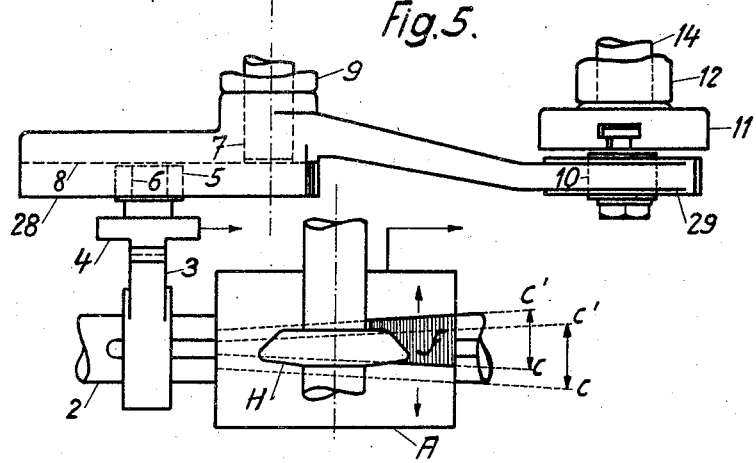

Fig. 1 shows one machine in plan view,
Fig. 2 in side elevation and
Fig. 3 in end elevation.
Figs. 4, 5, 6, 7, 8 show diagrammatically how the machine operates.
Figs. 9 and 10 show parts of a milling cutter made according to this invention.

The machine shown in Figs. 1 to 10 is used in combination with a milling machine of a known kind, not shown in the drawings. The milling machine has a milling table T which is capable of sliding to and fro in a bed, above which table the milling spindle Z on which the milling cutter H is mounted, is rotatably journalled, such that the axis of rotation of the milling spindle Z is perpendicular to the path of motion of the slide T. The table T and the milling spindle Z may be driven in any known manner. On the table T a casing 1 is fixed by screws. In the casing 1 a hollow shaft 2 is mounted so as to rotate therein. To the hollow shaft 2 a toothed segment 3 is rigidly fixed. With the toothed segment 3 there meshes a rack 4 which is capable of sliding vertically in guides in the casing 1. On the rack 4 is mounted a pin 6 on which a sliding member 5 is rotatably mounted. The sliding member 5 is capable of sliding in a slot 8 in an arm 28 which is pivoted to a pin 7 in a bearing 9. The bearing 9 is rigidly fixed to the transverse slide S of the milling machine, in which transverse slide the longitudinal slide T is capable of sliding. The lever 28 has two arms and is provided with a forked part 29, in which the sliding member 10 is capable of sliding. In the sliding member 10 is the crank pin 30 of a crank disc 11. The latter is mounted on the shaft 14 which is journalled in the bearing 12. The shaft 14 is driven from the drive of the milling spindle Z by means not shown in the drawing. In the hollow spindle 2 a spindle 32 is rotatably journalled, to which a dividing plate 16 is fixed. An arm 15 fixed to the end of the hollow spindle 2 carries a pin 17 which coacts with the holes 33 of the dividing plate 16. By means of the pin 17 the shaft 32 can be adjusted with respect to the hollow shaft 2, for determining the number of teeth of the milling cutter or the like being made. The blank A is fixed on a mandrel 20 by means of nuts 21. The mandrel is held between the centre 22 of the spindle 32 and the head-stock centre 23. The mandrel 20 is connected by a coupling sleeve 19 to the spindle 32 in such a manner that the mandrel 20 cannot turn with respect to the spindle 32.

Figure 8:
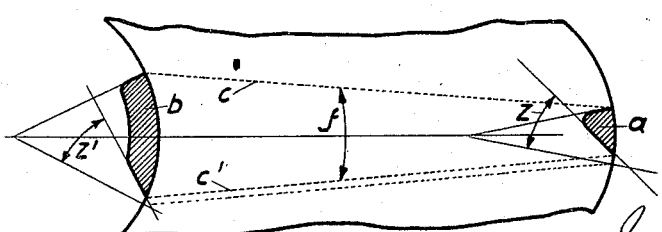

The machine operates in the following manner:

After the blank A has been placed between the centres, as already described, the longitudinal slide T is set back so far that the under surface b of the blank A is behind the milling cutter H. The slide T is thereupon raised by the depth of the cut to be made in the blank H. The end surface $b$ of the blank A is the edge, at which the cut commences. In this position the sliding piece 5 which is rotatably journalled on the pin 6 of the rack 4 from the centre of rotation of the pin 7, in the groove 8 of the pivoted arm 28 by the amount of the thickness or length of the blank A. On the machine being engaged in motion, the shaft 14 which turns the crank pin 30 commences to rotate, causing the pivoted arm 28 to rock. The rack 4 which is connected to the pivoted arm 28 and guided in the casing 1 slides up and down and by means of the toothed segment 3 rocks the hollow spindle 2 to and fro and with it the blank A. At the same time the working slide T is moved towards the milling cutter H and, since, as described above, the blank A turns with the rocking motion of the arm 28 in the two directions $d$, $d'$, a broad recess $f$ commencing at $b$ will be cut in the blank A when the slide commences its forward motion. As the sliding member 5 in the groove 8 approaches the pivotal point of the rocking lever 28, in correspondence with the progressive forward feed of the slide T, the oscillating motion of the blank A naturally becomes smaller and smaller and, when the pivotal pin 6 of the sliding member 5 is exactly opposite the pin 7 of the rocking lever 28 (Figs. 1 and 2), the motion of the rack 4 and the rotary motion of the blank A become equal to zero. Owing to the fact that the sliding member 5 in the groove 8 of the rocking-arm 28, the pivotal point of which is stationary, approaches near and nearer to the pivotal point of the said arm, a groove $f$ is cut in the blank A, the edges $c$ and $c'$ of which are at an angle to one another and follow helical lines, corresponding to the rocking angle to which the arm 28 is set. The edge $c$ of the groove $f$ forms the cutting edge of the teeth while the edge $c'$ forms the back of the teeth, in accordance with the profile of the milling cutter H. The teeth cut in this way in the blank A have a uniform profile as denoted by the angles $z$ and $z'$ (Fig. 8).

What I wish to secure by U. S. Letters Patent is:—

1. A machine for milling rotary cutting tools having their cutting edges extending longitudinally thereof comprising in combination a frame, a rotatably journalled milling spindle, a profiled milling cutter on said spindle, a slide adapted to slide at right angles to the said spindle, a shaft rotatably mounted in said slide, and adapted to receive the blank, means to oscillate said shaft in a constantly increasing or decreasing degree on the slide being advanced, said means comprising a spur wheel connected to the said blank carrying shaft, a rack meshing with said spur wheel, a double armed lever pivotally mounted in the frame, engaging said rack, means to continually increase or decrease the extent of movement of the said rack while the slide is being moved.

2. A machine for milling rotary cutting tools having their cutting edges extending longitudinally thereof comprising in combination a frame, a rotatably journalled milling spindle, a profiled milling cutter on said spindle, a slide adapted to slide at right angles to the said spindle, a shaft rotatably mounted in said slide, and adapted to receive the blank, means to oscillate said shaft in a constantly increasing or decreasing degree on the slide being advanced, said means comprising a spur wheel connected to the said blank carrying shaft, a rack meshing with said spur wheel, a double armed lever, pivotally mounted in the frame, a slot in one arm of said double armed lever radial to the pivotal axis of said lever, a bolt on said rack engaging said slot, a guide by which the rack is held in its engagement with the spur wheel on the slide, and means for oscillating the lever constantly as the slide advances.

In witness whereof I affix my signature.

ALOIS TSCHERNE.